(12) United States Patent
Takizawa et al.

(10) Patent No.: US 8,735,470 B2
(45) Date of Patent: May 27, 2014

(54) METHOD FOR FIBRILLATING CELLULOSE, CELLULOSE NANOFIBER, MASTERBATCH, AND RESIN COMPOSITION

(75) Inventors: Hironobu Takizawa, Sakura (JP); Tetsuya Harada, Sakura (JP); Takeshi Yamazaki, Sakura (JP); Jianye Jiang, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/876,032

(22) PCT Filed: Sep. 27, 2011

(86) PCT No.: PCT/JP2011/072070
§ 371 (c)(1),
(2), (4) Date: Jul. 3, 2013

(87) PCT Pub. No.: WO2012/043558
PCT Pub. Date: Apr. 5, 2012

(65) Prior Publication Data
US 2013/0289170 A1    Oct. 31, 2013

(30) Foreign Application Priority Data
Sep. 29, 2010 (JP) ................... 2010-218778

(51) Int. Cl.
*C08G 18/38* (2006.01)
*C08L 1/00* (2006.01)
*C08B 1/00* (2006.01)

(52) U.S. Cl.
USPC ............................................. 524/35; 536/56

(58) Field of Classification Search
USPC ............................................. 524/35; 536/56
See application file for complete search history.

(56) References Cited

U.S. PATENT DOCUMENTS

| | | | |
|---|---|---|---|
| 6,117,545 A * | 9/2000 | Cavaille et al. | 428/357 |
| 8,420,735 B2 * | 4/2013 | Hamada et al. | 525/54.21 |
| 2009/0192264 A1 * | 7/2009 | Laborie et al. | 525/54.21 |
| 2011/0263756 A1 * | 10/2011 | Yano et al. | 524/13 |

FOREIGN PATENT DOCUMENTS

| | | |
|---|---|---|
| JP | 2003-165909 A | 6/2003 |
| JP | 2005-042283 A | 2/2005 |
| JP | 2005-105081 A | 4/2005 |
| JP | 2006-290972 A | 10/2006 |
| JP | 2008-242154 A | 10/2008 |
| JP | 2009-029927 A | 2/2009 |
| JP | 2009-261993 A | 11/2009 |
| JP | 2010-209510 A | 9/2010 |
| WO | WO-2009/069641 A1 | 6/2009 |
| WO | WO-2010/050343 A1 | 5/2010 |

OTHER PUBLICATIONS

Machine Translation of JP 2005-042283, 2013.*
International Search Report dated Dec. 13, 2011, issued for PCT/JP2011/072070.

* cited by examiner

*Primary Examiner* — Liam Heincer
(74) *Attorney, Agent, or Firm* — Edwards Wildman Palmer LLP (57) ABSTRACT

The present invention provides a method for manufacturing a cellulose nanofiber, characterized by comprising the step of fibrillating cellulose in a polyester based resin, preferably in a polyester based resin having an ester group concentration of 6.0 mmol/g or more and a cellulose nanofiber produced by the manufacturing method concerned. In addition, the present invention provides a masterbatch composition containing the cellulose nanofibers and the polyester based resin. Furthermore, the present invention provides a resin composition containing the masterbatch composition and a diluent resin and a processed product thereof.

14 Claims, 3 Drawing Sheets

METHOD FOR FIBRILLATING CELLULOSE, CELLULOSE NANOFIBER, MASTERBATCH, AND RESIN COMPOSITION

TECHNICAL FIELD

The present invention relates to a cellulose nanofiber serving as a high-performance filler capable of being dispersed into various resins, a masterbatch and a resin composition, which contain cellulose nanofibers, and a method for fibrillating cellulose.

BACKGROUND ART

A cellulose nanofiber which has been developed in recent years is a natural material nanofiller derived from a plant and is noted as a low-specific gravity and high-strength composite material for a resin.

However, in order to fibrillate cellulose having many hydroxyl groups up to a nano-level, it is necessary to be fibrillated in water or to be fibrillated by mixing a resin with large amounts of water according to the technology at present. Therefore, cellulose nanofibers after fibrillation contain water to a great extent (refer to PTL 1). In the case where the resulting fibrillated cellulose nanofibers containing water are dispersed into various resins, a step to dehydrate the produced cellulose nanofibers is necessary. Meanwhile, cellulose forms an intermolecular hydrogen bond easily and, therefore, the cellulose nanofibers are re-flocculated during the dehydration step, so that dispersion in the resin is poor.

In order to solve these problems, a technology to produce cellulose nanofibers by fibrillating cellulose not in water, but in an organic solvent has been reported (refer to PTL 2). It is disclosed that, according to this technology, dehydration steps are not necessary so that cost of dispersion of nano fibers into resin is more competitive. However, combination with the resin requires steps to disperse in the organic solvent up to a nano-level initially and, then, remove the organic solvent. Therefore, it is not said that complicated production steps of the nanofibers have been improved.

That is, establishment of a technology capable of combining cellulose nanofibers with various resins through more inexpensive and simple steps has been required.

CITATION LIST

Patent Literature

PTL 1: Japanese Unexamined Patent Application Publication No. 2005-42283
PTL 2: Japanese Unexamined Patent Application Publication No. 2009-261993

SUMMARY OF INVENTION

Technical Problem

The issues of the present invention are to establish a new manufacturing method, in which water and organic solvent are not used in fibrillation of cellulose and dehydration and drying steps are not required, and provide a cellulose nanofiber capable of being dispersed into a resin easily and high-strength resin composition and a processed product including the cellulose nanofibers.

Solution to Problem

The present inventors performed intensive studies over and over again. As a result, it was found that cellulose was able to be fibrillated directly in a polyester based resin without using water or an organic solvent. In addition, it was found that cellulose nanofibers and a masterbatch obtained by this method were able to be as-is combined with other diluent resins without modification or the like of the cellulose. In this regard, a technology to fibrillate cellulose in the polyester based resin has not been known previously.

That is, the present invention provides a method for manufacturing a cellulose nanofiber characterized in that cellulose is fibrillated in a polyester based resin.

Advantageous Effects of Invention

According to the present invention, cellulose can be fibrillated directly in a polyester based resin without using water or an organic solvent. In addition, cellulose nanofibers and a masterbatch obtained by this method can be as-is combined with other diluent resins without the need for an operation of removal of water and organic solvent, so that a simple and good cellulose nanofiber-combined resin composition can be obtained. Furthermore, the resulting resin composition can be as-is made into a processed product and a high-strength processed product can be obtained because of an effect of the cellulose nanofibers.

DESCRIPTION OF EMBODIMENTS

The embodiments according to the present invention will be described below in detail. The description below is an example of the embodiments according to the present invention and the invention is not limited to the present description.

[Type of Cellulose]

The cellulose nanofibers according to the present invention are obtained by fibrillating various types of cellulose and can be used as resin reinforcements capable of enhancing the fracture toughness value and the like of a resin by being contained in the resin. It is enough that the cellulose according to the present invention can be utilized as a material for fibrillation and pulp, cotton, paper, regenerated cellulose fibers, e.g., rayon•cupra•polynosic•acetate, bacterial cellulose, cellulose derived from animals, e.g., ascidian, and the like can be utilized. In this regard, the surface of the above-described cellulose may be subjected to a chemical modification treatment, as necessary.

As for pulp, either wood pulp or nonwood pulp can be used favorably. The wood pulp includes mechanical pulp and chemical pulp, and the chemical pulp having a small lignin content is preferable. Examples of chemical pulp include sulfite pulp, kraft pulp, and alkali pulp, and every pulp can be used favorably. As for the nonwood pulp, all of straw, bagasse, kenaf, bamboo, reed, paper mulberry, flax, and the like can be utilized.

Cotton is a plant which is used mainly for clothing fibers, and all of raw cotton, cotton fiber, and cotton cloth can be utilized.

Paper is produced by taking fibers from the pulp and performing papermaking, and waste paper, e.g., newspaper, waste milk carton, and used copy paper, can also be used favorably.

Meanwhile, a cellulose powder which is produced by pulverizing cellulose and which has a predetermined particle diameter distribution may be used as cellulose serving as a fibrillation material, and examples include KC FLOCK produced by NIPPON PAPER INDUSTRIES CO., LTD. CHEMICAL DIVISION, CEOLUS produced by Asahi Kasei Chemicals Corp., and Avicel produced by FMC.

[Polyester Based Resin]

A polyester based resin according to the present invention is a polyester obtained by reacting at least one type of polyol represented by the general formula (1) described below and at least one type of polycarboxylic acid represented by the general formula (2) described below.

$$A\text{-}(OH)_m \qquad (1)$$

[In the formula, A represents an aliphatic hydrocarbon group which may contain an oxygen atom and which has the carbon number of 1 to 20, an aromatic group which may have a substituent, or a heterocyclic aromatic group, and m represents an integer of 2 to 4.]

$$B\text{—}(COOH)_n \qquad (2)$$

[In the formula, B represents an aliphatic hydrocarbon group having the carbon number of 1 to 20, an aromatic group which may have a substituent, or a heterocyclic aromatic group, and n represents an integer of 2 to 4.]

Examples of polyols represented by the general formula (1) include ethylene glycol, propylene glycol, 1,3-butanediol, 1,4-butanediol, pentyl glycol, neopentyl glycol, 1,5-pentanediol, 1,6-hexanediol, 1,7-heptanediol, 1,8-octanediol, 1,9-nonanediol, 1,10-decanediol, 1,11-undecanediol, 1,12-dodecanediol, diethylene glycol, triethylene glycol, tetraethylene glycol, polyethylene glycol, dipropylene glycol, polypropylene glycol, 2-methyl-1,3-propanediol, 2-butyl-2-ethyl-propanediol, 2-methyl-1,4-butanediol, 2-ethyl-1,4-butanediol, 2-methyl-1,3-propanediol, 3-methyl-1,5-pentanediol, 3-methyl-1,5-heptanediol, hydrogenated bisphenol A, adduct of bisphenol A and propylene oxide or ethylene oxide, 1,2,3,4-tetrahydroxybutane, glycerin, trimethyrolpropane, 1,3-propanediol, 1,2-cyclohexane glycol, 1,3-cyclohexane glycol, 1,4-cyclohexane glycol, 1,4-cyclohexane dimethanol, paraxylene glycol, bicyclohexyl-4,4'-diol, 2,6-decalin glycol, 2,7-decalin glycol, ethylene glycol carbonate, glycerin, trimethyrolpropane, and pentaerythritol.

Examples of polycarboxylic acid represented by the general formula (2) include unsaturated dibasic acids and anhydrides thereof, maleic acid, maleic acid anhydride, fumaric acid, itaconic acid, citraconic acid, chloromaleic acid, and esters and the like thereof, halogenated maleic acid anhydride and the like, α,β-unsaturated dibasic acids, e.g., aconitic acid, and β,γ-unsaturated dibasic acids, e.g., dihydromuconic acid. Meanwhile, examples of saturated dibasic acid and anhydrides thereof include phthalic acid, phthalic acid anhydride, halogenated phthalic acid anhydride, isophthalic acid, terephthalic acid, nitrophthalic acid, tetrahydrophthalic acid, tetrahydrophthalic acid anhydride, endomethylene tetrahydrophthalic acid anhydride, halogenated phthalic acid anhydride, and esters and the like thereof, hexahydrophthalic acid, hexahydrophthalic acid anhydride, hexahydroterephthalic acid, hexahydroisophthalic acid, 1,4-cyclohexanedicarboxylic acid, 1,3-cyclohexanedicarboxylic acid, methylhexahydrophthalic acid, HET acid, 1,1-cyclobutanedicarboxylic acid, oxalic acid, succinic acid, succinic acid anhydride, malonic acid, glutaric acid, adipic acid, azelaic acid, pimelic aid, sberic acid, azelaic acid, sebacic acid, 1,12-dodecanedioic acid, 2,6-naphthalenedicarboxylic acid, 2,7-naphthalenedicarboxylic acid, 2,3-naphthalenedicarboxylic acid, 2,3-naphthalenedicarboxylic acid anhydride, 4,4'-biphenyldicarboxylic acid, and dialkyl esters and the like thereof.

In this regard, monohydric alcohol, monovalent carboxylic acid, and hydroxycarboxylic acid may be used in addition to the above-described polyol and polycarboxylic acid to the extent of substantially not impairing the characteristics thereof.

Examples of monohydric alcohols include methanol, ethanol, propanol, isopropanol, butanol, isobutanol, 2-butanol, 3-butanol, n-amyl alcohol, n-hexanol, isohexanol, n-heptanol, isoheptanol, n-octanol, 2-ethylhexanol, isooctanol, n-nonanol, isononanol, n-decanol, isodecanol, isoundecanol, lauryl alcohol, cetyl alcohol, decyl alcohol, undecyl alcohol, tridecyl alcohol, benzyl alcohol, and stearyl alcohol. At least one type of them may be used.

Examples of monovalent carboxylic acid include benzoic acid, heptanoic acid, nonanoic acid, caprylic acid, nonanoic acid, capric acid, undecylic acid, and lauric acid. At least one type of them may be used.

Examples of hydroxycarboxylic acid include lactic acid, glycolic acid, 2-hydroxy-n-butyric acid, 2-hydroxycaproic acid, 2-hydroxy-3,3-dimethylbutyric acid, 2-hydroxy-3-methylbutyric acid, 2-hydroxyisocaproic acid, and p-hydroxybenzoic acid. At least one type of them may be used.

Meanwhile, as for the polyester based resin according to the present invention, a modified polyester resin obtained by modifying polyester may be used. Examples of modified polyester resin include urethane-modified polyester, acryl-modified polyester, epoxy-modified polyester, and silicone-modified polyester.

In addition, the polyester based resin according to the present invention may be in the shape of a straight chain or a hyperbranched polyester may be used.

The ester group concentration of the polyester based resin according to the present invention is preferably 6.0 mmol/g or more, more preferably 6.0 to 14 mmol/g, further preferably 6.0 to 20 mmol/g, and particularly preferably 6.0 to 30 mmol/g.

It is preferable that the ester group concentration be 6.0 mmol/g or more and, in addition, the acid value be 10 or more. The acid value is more preferably 10 to 100, further preferably 10 to 200, and particularly preferably 10 to 300.

Meanwhile, it is preferable that the ester group concentration be 6.0 mmol/g or more and, in addition, the hydroxyl value be 10 or more.

The hydroxyl value is more preferably 10 to 500, further preferably 10 to 800, and particularly preferably 10 to 1,000.

In this regard, it is particularly preferable that the ester group concentration of the polyester based resin according to the present invention be 6.0 mmol/g or more, the acid value be 10 or more and, in addition, the hydroxyl value be 10 or more.

In the present invention, the above-described polyester based resins may be used alone, or a plurality of reins may be used in combination.

[Fibrillation of Cellulose in Polyester Based Resin]

Fibrillation of cellulose can be performed by adding cellulose into a polyester based resin and applying a shearing force mechanically. As for the device to apply the shearing force, the shearing force can be applied by using known kneading machines, e.g., bead mills, ultrasonic homogenizers, extruders, such as, uniaxial extruders and biaxial extruders, Banbury mixers, grinders, pressure kneaders, and twin rolls. Among them, it is preferable that the pressure kneader be used from the viewpoint of obtainment of stable shearing force even in a high-viscosity resin.

Cellulose is converted to cellulose nanofibers by the fibrillation method according to the present invention. In the fibrillation method according to the present invention, for example, it is possible to fibrillate into 100 nm to 1,000,000 nm in a major axis direction and 5 nm to 1,000 nm in a minor axis direction.

In the present invention, the ratio of the polyester based resin to the cellulose can be changed optionally. In the case where mixing with a diluent resin is performed after fibrillation, an effect of fiber reinforcement can be further exerted as the cellulose concentration in the polyester based resin increases to some extent in advance. On the other hand, if the ratio of the polyester based resin is too small, a cellulose fibrillation effect cannot be obtained sufficiently. It is favorable that the ratio of the cellulose to the cellulose in the composition of the polyester based resin is 10 percent by mass to 90 percent by mass, preferably 30 percent by mass to 70 percent by mass, and more preferably 40 percent by mass to 60 percent by mass.

[Masterbatch]

The cellulose nanofibers fibrillated in the polyester based resin can be as-is utilized as a masterbatch without being subjected to a refining step. In addition, the masterbatch in itself may be used as the resin composition according to the present invention, so as to directly produce a processed product.

The masterbatch according to the present invention includes the polyester based resin and the cellulose nanofibers obtained by fibrillating cellulose as indispensable components. Various resins, additives, organic and inorganic fillers, and the like can be added within the bound of not impairing the effect of the present invention. Various resins, additives, and organic and inorganic fillers may be added before fibrillation of the cellulose, or be added after fibrillation. However, a substance which requires an impurity removing step, e.g., drying or refining, in the combination with the diluent resin thereafter is not preferable because the effect of the invention is impaired.

[Diluent Resin]

The strength of the resin composition can be improved by mixing the masterbatch containing the cellulose nanofibers and serving as a resin reinforcement into the diluent resin. The diluent resin is not specifically limited and may be a monomer or a polymer. Either thermoplastic resin or thermosetting resin can be used. In this regard, one of these resins may be used, and some of these resins may be used in combination.

The thermoplastic resin refers to a resin capable of being melt-formed by heating. Specific examples thereof include polyethylene resins, polypropylene resins, polystyrene resins, rubber-modified polystyrene resins, acrylonitrile-butadiene-styrene (ABS) resins, acrylonitrile-styrene (AS) resins, polymethyl methacrylate resins, acrylic resins, polyvinyl chloride resins, polyvinylidene chloride resins, polyethylene terephthalate resins, ethylene vinyl alcohol resins, cellulose acetate resins, ionomer resins, polyacrylonitrile resins, polyamide resins, polyacetal resins, polybutylene terephthalate resins, polylactic acid resins, polyphenylene ether resins, modified polyphenylene ether resins, polycarbonate resins, polysulfone resins, polyphenylene sulfide resins, polyether imide resins, polyether sulfone resins, polyarylate resins, thermoplastic polyimide resins, polyamide imide resins, polyether ether ketone resins, polyketone resins, liquid crystal polyester resins, fluororesins, syndiotactic polystyrene resins, and cyclic polyolefin resins. At least one type of these thermoplastic resins can be used alone or in combination.

The thermosetting resin refers to a resin having a capability of becoming substantially insoluble and infusible when being cured by means of heating, radiation, catalyst, or the like. Specific examples thereof include phenol resins, urea resins, melamine resins, benzoguanamine resins, alkyd resins, unsaturated polyester resins, vinyl ester resins, diallylphthalate resins, epoxy resins, silicone resins, urethane resins, furan resins, ketone resins, xylene resins, and thermosetting polyimide resins. At least one type of these thermoplastic resins can be used alone or in combination. Meanwhile, in the case where the primary component of the resin according to the present invention is a thermoplastic resin, a small amount of thermosetting resin can be added within the bound of not impairing the characteristics of the thermoplastic resin or, conversely, in the case where the primary component is the thermosetting resin, a small amount of thermoplastic resin can be added within the bound of not impairing the characteristics of the thermosetting resin.

The ratio of the masterbatch to the diluent resin in the above-described resin composition is optionally determined within the bound of not impairing the effect of the present invention. It is preferable that the amount of cellulose nanofibers in the resin composition in which the masterbatch and the diluent resin are blended be 0.5 percent by mass to 30 percent by mass.

[Other Additives]

The above-described resin composition may contain previously known various additives in accordance with the use thereof within the bound of not impairing the effect of the present invention. Examples can include hydrolysis inhibitors, colorants, flame retardants, antioxidants, polymerization initiators, polymerization inhibitors, ultraviolet absorbing agents, antistatic agents, lubricants, mold release gents, antifoaming agents, leveling agents, light stabilizers (for example, hindered amine), antioxidants, inorganic fillers, and organic fillers.

The resin composition according to the present invention can be used as a forming material, a coating material, a painting material, and an adhesive.

[Forming Method]

A method for forming a processed product according to the resin composition of the present invention is not specifically limited. In the case where a tabular product is produced, in general, an extrusion forming is employed, although flat press can also be employed. In addition, a contour extrusion forming method, a blow forming method, a compression forming method, a vacuum forming method, an injection forming method, and the like can be used. Meanwhile, in the case where a film-shaped product is produced, besides the melt-extrusion method, a solution casting method can be used. In the case where the melt-forming method is used, inflation film forming, cast-forming, extrusion lamination forming, calender forming, sheet forming, fiber forming, blow forming, injection forming, rotary forming, coat forming, and the like are mentioned. Furthermore, in the case of a resin curable by active energy rays, processed products can be produced by using various curing methods through the use of active energy rays.

[Uses]

The resin composition according to the present invention can be utilized for various uses favorably. Examples include automobile parts, aircraft parts, electronic•electric parts, construction materials, container•packing members, housewares, and sports•leisure goods, although not limited to them.

EXAMPLES

The aspect according to the present invention is described below in further detail, although the present invention is not limited to this. In this regard, part and percent are in terms of weight unless otherwise specified.

Method for Synthesizing Polyester Based Resin

Synthesis Example 1

Production of Polyester Based Resin 1

A 2-L glass flask provided with a nitrogen gas introduction tube, a reflux condenser, and an agitator was charged with 758.2 parts (7.14 mol, charge molar ratio 0.53) of diethylene glycol, 652.6 parts (4.47 mol, charge molar ratio 0.33) of adipic acid, and 183.9 parts (1.88 mol, charge molar ratio 0.14) of maleic acid anhydride, and heating was started in a nitrogen stream. A dehydration condensation reaction was induced at an inside temperature of 200° C. by a common method. When the acid value reached 13 KOHmg/g, cooling to 150° C. was performed immediately, 100 ppm of 2,6-di-tert-butyl-p-cresol relative to the charge weight of the raw materials was added. Cooling was further performed to room temperature, so as to obtain Resin 1.

Synthesis Examples 2 to 22

Production of Polyester Based Resins 2 to 22

The same synthesis apparatus as that in Synthesis example 1 was used, raw material monomers were charged at a monomer composition (molar ratio) shown in Table 1, and a dehydration condensation reaction was induced. The reaction was induced up to a predetermined acid value, and 100 ppm of 2,6-di-tert-butyl-p-cresol relative to the charge weight of the raw materials was added, as in production of Polyester based resin 1. Cooling was further performed to room temperature, so as to obtain Resins 2 to 20. In this regard, as for Polyester based resins 14, 21, and 22, the resins were produced without charging 2,6-di-tert-butyl-p-cresol.

[Method for Calculating Ester Group Concentration]

The ester group concentration was determined on the basis of the following calculation formula (1).

ester group concentration (mmol/g)=amount of generation of ester group (mol)/[amount of charge of monomer (wt)−amount of generation of water (wt)]×1000  (1)

The method for calculating the ester group concentration will be described in further detail with reference to Polyester based resin 1. The amount of generation of ester group was calculated on the assumption that the total amount of charged monomer undergo an esterification reaction.

amount of generation of ester group=adipic acid 4.47 mmol×2+maleic acid anhydride 1.88 mmol×2=12.70 mmol Subsequently, the amount of generation of water was calculated on the assumption that the total amount of charged monomer undergo an esterification reaction, as with the ester group.

amount of generation of water=(adipic acid 4.47 mmol×2+maleic acid anhydride 1.88 mmol)×18.02=194.98

According to the above description, the ester group concentration of Polyester based resin 1 is determined on the basis of the following calculation formula (2).

ester group concentration (mmol/g)=12.70 mol/[1594.70−194.98]×1000=9.1  (2)

[Measurement of Hydroxyl Value]

The terminal hydroxyl value and acid value were determined on the basis of the area ratio of the respective peaks derived from the terminal structure and the ester bond in a 13C-NMR spectrum. JNM-LA300 produced by JEOL LTD., was used as a measurement apparatus, 10 mg of $Cr(arac)_3$ serving as a shiftless relaxation reagent was added to 10 percent by weight deuterated chloroform serving as a sample, and 13C-NMR quantitative measurement was performed by a gated decoupling method. Integration was performed 4,000 times.

[Cellulose Fibrillation Method by Using Polyester Based Resin]

Example 1

Polyester Based Resin 1

A fibrillation treatment of cellulose was performed by pressure-kneading, 600 parts by weight of Polyester based resin 1 and 400 parts by weight of cellulose powder product "KC FLOCK" produced by NIPPON PAPER INDUSTRIES CO., LTD. CHEMICAL DIVISION through the use of a pressure kneader (DSI-5 GHH-H) produced by Moriyama Company Ltd., at 60 rpm for 300 minutes. A masterbatch, which was the resulting kneaded material of the resin and the cellulose, was suspended in acetone in such a way that the cellulose concentration became 1 percent by mass, and a dispersion treatment was performed through the use of Model T.K. Homomixer A produced by Tokushu Kika kogyo Co., Ltd., at 15,000 rpm for 20 minutes. Acetone was dried by spreading on glass, and the fibrillation state of cellulose was examined with a scanning electron microscope. As for the evaluation of the fibrillation state of cellulose in the masterbatch, the case where fibrillated cellulose fibers fibrillated into the length of finer than 1,000 nm in a minor axis direction were present on the basis of observation with the scanning electron microscope under the magnification of 10,000 times was evaluated as Δ, and the case where fibers fibrillated into the length of finer than 100 nm were present was evaluated as ◯.

Examples 2 to 22

Polyester Based Resins 2 to 22

The same apparatus as that in the fibrillation method in Example 1 was used, and Polyester based resins 2 to 22 shown in Table 1-1 and Table 1-2 were also subjected to the fibrillation treatment of cellulose under the same condition. Each of the resulting master batches was observed with the electron microscope as with Polyester based resin 1, and the fibrillation state was evaluated.

All results are collectively shown in Table 1.

TABLE 1-1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | | Polyester based resin | | | | | | | | | | |
| | | 1 | 2 | 3 | 4 | 5 | 6 | 7 | 8 | 9 | 10 | 11 |
| Polyol (molar ratio) | Diethylene glycol | 0.53 | 0.51 | 0.6 | 0.67 | 0.55 | 0.45 | 0.45 | 0.42 | | | |
| | 1,6-Hexanediol | | | | | | | | | 0.54 | 0.54 | 0.54 |
| | Ethylene glycol | | | | | | | | | | | |
| | 1,10-Decanediol | | | | | | | | | | | |
| | 3-Methyl-1,5-pentanedol | | | | | | | | | | | |
| Polycarboxylic acid (molar ratio) | Adipic acid | 0.33 | 0.35 | 0.29 | 0.24 | 0.32 | 0.39 | 0.39 | 0.36 | | | |
| | 1,12-Dodecanediol | | | | | | | | | | | |
| | Suberic acid | | | | | | | | | 0.33 | | |
| | Hexahydrophthalic acid anhydride | | | | | | | | | | 0.33 | |
| | Phthalic acid anhydride | | | | | | | | | | | 0.33 |
| | Succinic acid anhydride | | | | | | | | | | | |
| | Maleic acid anhydride | 0.14 | 0.14 | 0.11 | 0.09 | 0.13 | 0.16 | 0.16 | 0.14 | 0.13 | 0.13 | 0.13 |
| Other monomers | Isononanol | | | | | | | | 0.08 | | | |
| | Heptanoic acid | | | | | | | | | | | |
| | Acid value (KOHmg/g) | 12 | 15 | 13 | 10 | 9 | 78 | 87 | 44 | 10 | 17 | 15 |
| | Hydroxyl value (KOHmg/g) | 89 | 52 | 224 | 374 | 125 | 21 | 28 | 30 | 78 | 94 | 89 |
| | Ester group concentration (mmol/g) | 9.1 | 9.4 | 7.7 | 6.3 | 8.7 | 8.5 | 8.5 | 8.4 | 7.7 | 7.8 | 7.9 |
| | Fibrillation state evaluation | ○ | ○ | ○ | ○ | ○ | ○ | ○ | ○ | ○ | ○ | ○ |

TABLE 1-2

| | | Example | | | | | | | | | | |
|---|---|---|---|---|---|---|---|---|---|---|---|---|
| | | 12 | 13 | 14 | 15 | 16 | 17 | 18 | 19 | 20 | 21 | 22 |
| | | Polyester based resin | | | | | | | | | | |
| | | 12 | 13 | 14 | 15 | 16 | 17 | 18 | 19 | 20 | 21 | 22 |
| Polyol (molar ratio) | Diethylene glycol | | | 0.53 | 0.5 | | 0.38 | | | 0.46 | | |
| | 1,6-Hexanediol | 0.46 | | | | 0.46 | | | | | | 0.53 |
| | Ethylene glycol | | 0.52 | | | | | | | | | |
| | 1,10-Decanediol | | | | | | | 0.51 | 0.56 | | | |
| | 3-Methyl-1,5-pentanedol | | | | | | | | | | 0.54 | |
| Polycarboxylic acid (molar ratio) | Adipic acid | | | 0.33 | 0.3 | | 0.33 | | | 0.27 | 0.46 | 0.47 |
| | 1,12-Dodecanediol | | | | | | | 0.35 | 0.32 | | | |
| | Suberic acid | | | | | | | | | | | |
| | Hexahydrophthalic acid anhydride | | | | | | | | | | | |
| | Phthalic acid anhydride | 0.38 | | | | 0.38 | | | | | | |
| | Succinic acid anhydride | | 0.34 | 0.14 | | | | | | | | |
| | Maleic acid anhydride | 0.16 | 0.14 | | 0.12 | 0.16 | 0.13 | 0.14 | 0.12 | 0.11 | | |
| Other monomers | Isononanol | | | | | | 0.16 | | | | | |
| | Heptanoic acid | | | | 0.08 | | | | | 0.16 | | |
| | Acid value (KOHmg/g) | 82 | 15 | 15 | 6 | 55 | 6 | 13 | 11 | 6 | 0.4 | 0.4 |
| | Hydroxyl value (KOHmg/g) | 49 | 75 | 72 | 62 | 4 | 6 | 18 | 83 | 10 | 56 | 55 |
| | Ester group concentration (mmol/g) | 7.7 | 13.4 | 9.0 | 8.7 | 7.7 | 8.4 | 5.9 | 5.2 | 8.8 | 8.1 | 8.7 |
| | Fibrillation state evaluation | ○ | ○ | ○ | ○ | ○ | Δ | Δ | Δ | ○ | ○ | ○ |

Example 23

Fracture Toughness of Processed Product Using Masterbatch Obtained by Polyester Based Resin 1

[Production of Processed Product]

A fibrillation treatment of cellulose was performed by pressure-kneading 600 parts by weight of Polyester based resin 1 and 400 parts by weight of cellulose powder product "KC FLOCK" produced by NIPPON PAPER INDUSTRIES CO., LTD. CHEMICAL DIVISION through the use of a pressure kneader (DSI-5 GHH-H) produced by Moriyama Company Ltd., at 60 rpm for 660 minutes, so as to produce a masterbatch. A test specimen was produced by using the resulting masterbatch containing fibrillated cellulose and using a forming method described below, and the fracture toughness value was measured.

[Forming Method]

A forming method for a test plate will be described below. After 2.5 parts by weight of masterbatch concerned was added to 79.4 parts by weight of epoxy resin EPICRON850 produced by DIC Corporation, dispersion and agitation were performed with a homomixer (produced by PRIMIX Corporation). Subsequently, 18.1 parts by weight of IPDA (isophoronediamine) was added, and agitation was performed with an agitator until homogeneity was ensured. Furthermore, deaeration was performed in a vacuum chamber, and a cast-molded plate having a thickness of 6 mm was obtained by performing casting and heating at 110° C. for 30 minutes to induce curing.

[Test Specimen Production Method]

A test specimen (the present test specimen height W=12.7 mm, depth B=6 mm, size of notch and precrack a=0.45 to 0.55

W) specified in ASTM D-5045 (three-point bend specimen (SENB)) was produced from the resulting cast-molded plate with N=8.

[Fracture Toughness Test]

A three-point bending test was performed in conformity with ASTM D-5045 under the condition of span of 50.8 mm and head speed of 10 mm/min. It was ascertained that a load-displacement curve was within a linear range by a predetermined method, and the fracture toughness value was calculated.

Figure 1:
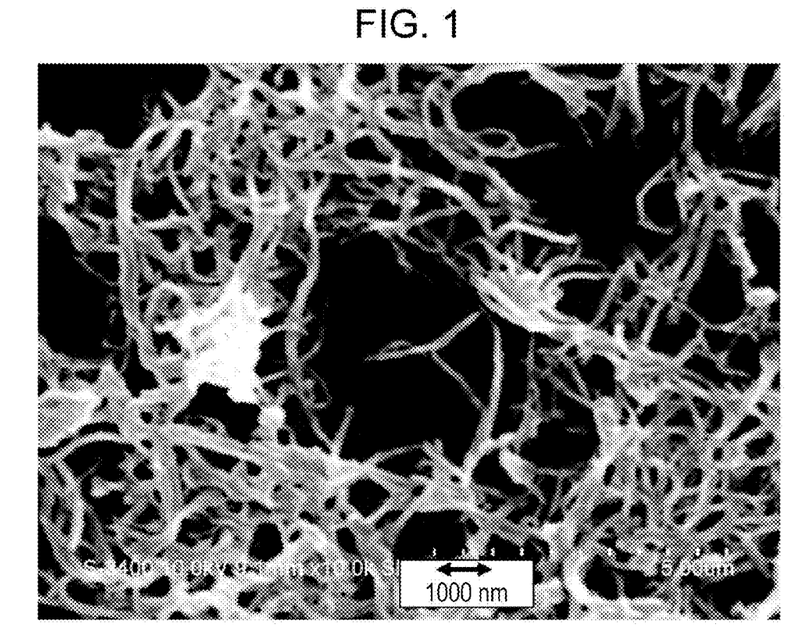
FIG. 1 is an electron micrograph of cellulose nanofibers obtained in Example 13.
Figure 2:
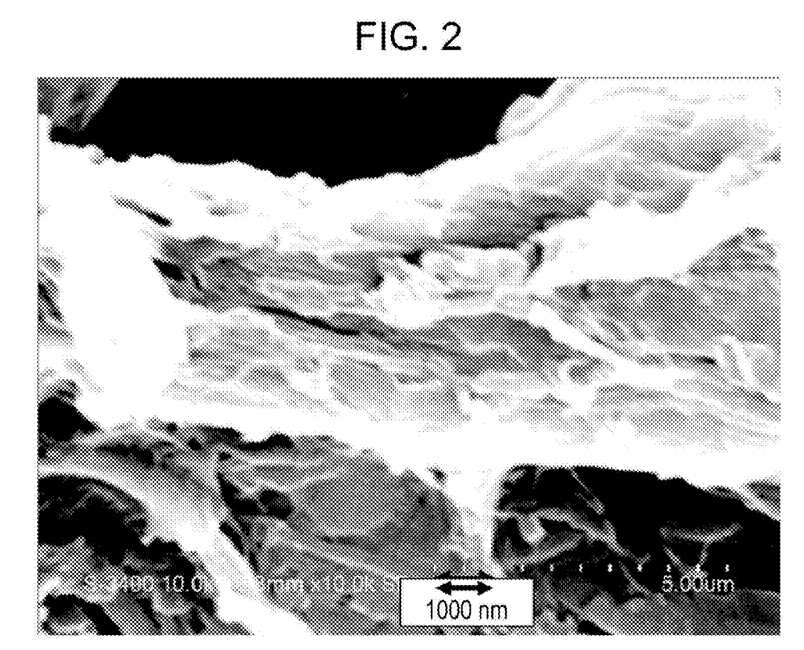
FIG. 2 is an electron micrograph of cellulose nanofibers obtained in Example 18.
Figure 3:
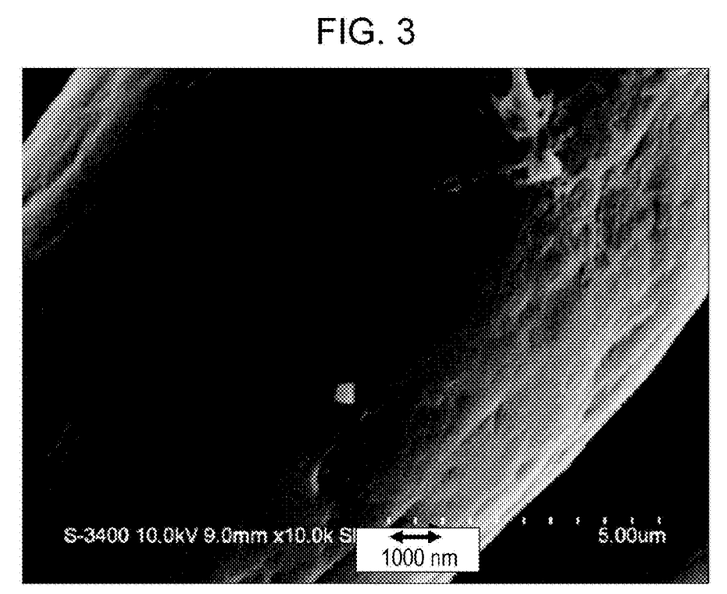
FIG. 3 is an electron micrograph of cellulose (KC FLOCK produced by NIPPON PAPER INDUSTRIES CO., LTD. CHEMICAL DIVISION) before fibrillation.

The results of all fracture toughness values are shown in FIG. 1.

Example 24

Fracture Toughness of Processed Product Using Masterbatch Obtained by Polyester Based Resin 15

The same apparatus as that in the fibrillation method in Example 23 was used, and Resin 15 shown in Table 1 was also subjected to the fibrillation treatment of cellulose under the same condition. The resulting masterbatch was used. A test specimen was produced by employing a forming method under the same condition as with Example 23, and the fracture toughness value was measured.

Example 25

Fracture Toughness of Processed Product Using Masterbatch Obtained by Polyester Based Resin 16

The same apparatus as that in the fibrillation method in Example 23 was used, and Resin 16 shown in Table 1 was also subjected to the fibrillation treatment of cellulose under the same condition. The resulting masterbatch was used. A test specimen was produced by employing a forming method under the same condition as with Example 23, and the fracture toughness value was measured.

Comparative Example 1

Fracture Toughness of Processed Product Containing no Cellulose Nanofiber No. 1

After 1.5 parts by weight of Polyester based resin 1 was added to 80.2 parts by weight of epoxy resin EPICRON850 produced by DIC Corporation, dispersion and agitation were performed with a homomixer (produced by PRIMIX Corporation). Subsequently, 18.1 parts by weight of IPDA (isophoronediamine) was added, and agitation was performed with the homomixer until homogeneity was ensured. Furthermore, deaeration was performed in a vacuum chamber, and a cast-molded plate having a thickness of 6 mm was obtained by performing casting and heating at 110° C. for 30 minutes to induce curing.

The resulting cast-molded plate was subjected to the fracture toughness test in the same manner as that in Example 23.

Comparative Example 2

Fracture Toughness of Processed Product Containing No Cellulose Nanofiber No. 2

After 18.3 parts by weight of IPDA (isophoronediamine) was added to 80.2 parts by weight of epoxy resin EPICRON850 produced by DIC Corporation, and homomixing was performed with a homomixer (produced by PRIMIX Corporation) until homogeneity was ensured. Furthermore, deaeration was performed in a vacuum chamber, and a cast-molded plate having a thickness of 6 mm was obtained by performing casting and heating at 110° C. for 30 minutes to induce curing.

The resulting cast-molded plate was subjected to the fracture toughness test in the same manner as that in Example 23.

Figure 4:
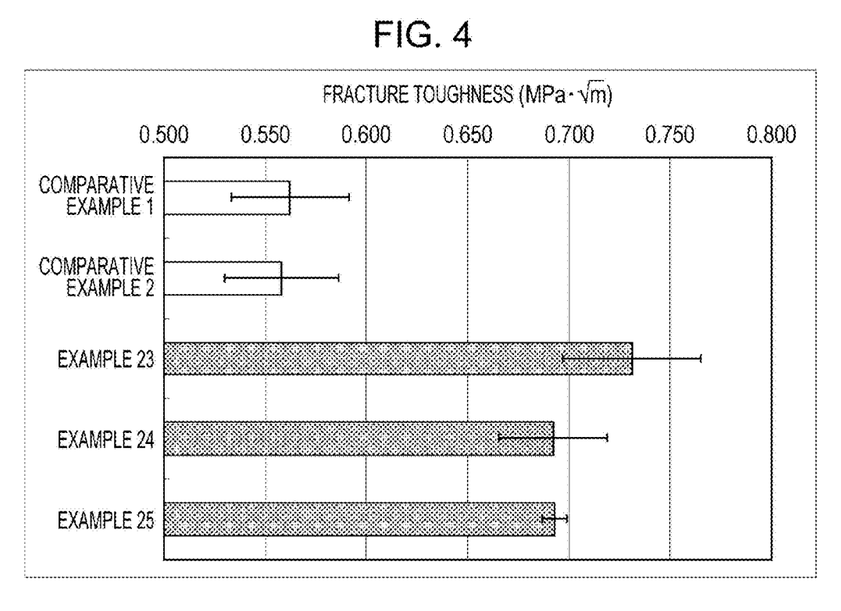
FIG. 4 is a graph showing fracture toughness values of Examples 23 to 25 and Comparative examples 1 and 2.

The results of Examples 23 to 25 and Comparative examples 1 and 2 were collectively shown in FIG. 4.

Example 26

Hyperbranched Polyester Based Resin

In Example 1, hyperbranched polyester resin "Boltorn H20" (OH value 490-520) was used in place of Polyester based resin 1, and a fibrillation treatment of cellulose in the resulting masterbatch was performed under the same condition, so as to produce a masterbatch. The fibrillation state of cellulose was evaluated. As a result, fibers fibrillated into finer than 100 nm were present and, therefore, the fibrillation state of cellulose in the masterbatch was evaluated as ○.

Examples 27 to 31

Test for Examining Dispersibility in Diluent Resin

After 1.5 parts by weight of masterbatch obtained by Polyester based resin 1 was added to 100 parts by weight of various diluent resins shown in Table 3, dispersion and agitation were performed with a dispersion machine described below. The case where the masterbatch was able to be dispersed uniformly without becoming a block in the diluent resin was indicated as ○. The results of dispersibility of all diluent resins used for the test are shown in Table 3.

TABLE 3

| | Name of diluent resin | Resin species | Dispersion method | Masterbatch dispersibility |
|---|---|---|---|---|
| Example 27 | EPICLON850 (produced by DIC Corporation) | epoxy resin | 1 | ○ |
| Example 28 | TYFORCE H-845 (produced by DIC Corporation) | polyurethane resin | 2 | ○ |
| Example 29 | DICLITE UE-3505 (produced by DIC Corporation) | vinyl ester resin | 1 | ○ |
| Example 30 | Homo PP H-700 (produced by Prime Polymer Co., Ltd.) | polypropylene resin | 3 | ○ |
| Example 31 | SUNDHOMA FG-283 (produced by DH Material Inc.) | unsaturated polyester resin | 1 | ○ |

Dispersion method 1 homomixer (produced by PRIMIX Corporation)
Dispersion method 2 kneader (produced by Moriyama Company Ltd.)
Dispersion method 3 biaxial extruder (produced by TECHNOVEL CORPORATION)

Example 32

Measurement of Izod Impact-Value of Polypropylene Processed Product Using Masterbatch Containing Cellulose Nanofibers Obtained by Polyester Based Resin 1

[Production of Processed Product]

The masterbatch produced in Example 23 was used. A test specimen was produced by employing a forming method described below, and the Izod impact value was measured.

The masterbatch in the proportion of 10.0 parts by weight was added to polypropylene resin Homo PP H-700 (produced by Prime Polymer Co., Ltd.), melting•kneading was performed with a biaxial extruder (produced by TECHNOVEL CORPORATION, screw diameter: 25 mm), and pelletization (size about 1.5 mm×1.5 mm) was performed by using a pelletizer (model: VC produced by Nakatani Machinery Ltd.), so as to obtain pellets in which cellulose nanofibers were dispersed. The melting•kneading condition was as described below.

<Melting•Kneading Condition>
Screw diameter: 25 mm
The number of revolutions of screw: 150 rpm
Amount of discharge: about 6 kg/hr
Set temperature: 200° C.

The resulting pellets were put into an injection molding machine J-50M (produced by Japan Steel Works, Ltd.), and were injected into a die of JIS K139 multipurpose test specimen A. The resulting formed article was cut to have a notch (notch type A, notch radius 0.25 mm, width of notch portion 8 mm), so as to obtain a JIS K7110-ISO180/1A test specimen having a thickness of 4 mm, a width of 10 mm, and a length of 80 mm (molding temperature 200° C., die temperature 25° C.)

[Measurement of Izod Impact Value]

The above-described test specimen was notched by using a notching tool (Model: A-3, V type cutter edge produced by Toyo Seiki Seisaku-sho, Ltd.). The Izod impact value (kJ/m2, 23° C.) of the resulting test specimen with notch was measured by using an Izod impact tester (produced by Toyo Seiki Seisaku-sho, Ltd.).

Comparative Example 3

Measurement of Izod impact value of processed product containing no cellulose nanofiber A test specimen, which was a processed product, was produced by using polypropylene resin Homo PP H-700 (produced by Prime Polymer Co., Ltd.) under the melting•kneading and molding conditions described in Example Example 32, and the Izod impact value was provided in the same manner.

The results of Izod impact values in Example 32 and Comparative example 3 are shown in Table 4.

TABLE 4

|  | Comparative example 3 | Example 32 |
|---|---|---|
| Homo PP H700 | 100 | 90 |
| Masterbatch | 0 | 10 |
| Izod impact value (kJ/m2) | 3.1 | 3.6 |
| with notch | 2.7 | 3.9 |
| 2.75J Hammer | 2.5 | 3.0 |
| Average value | 2.8 | 3.5 |

Example 33

Measurement of Fracture Toughness Value of Vinyl Ester Resin Processed Product Using Masterbatch Containing Cellulose Nanofibers Obtained by Polyester Based Resin 1

[Production of Processed Product, Method for Producing Test Specimen, and Fracture Toughness Test]

The masterbatch produced in Example 23 was used. A test specimen was produced by employing a forming method described below, and the fracture toughness value was measured.

After 0.3 parts by weight of 6% Co-Naph (cobalt naphthenate) and the masterbatch in the proportion of 5.0 parts by weight in terms of cellulose content were added to a vinyl ester resin UE-3505 (produced by DIC Corporation), dispersion and agitation were performed with a homomixer (produced by PRIMIX Corporation). Furthermore, 1 part by weight of 55% methyl ethyl ketone peroxide (PERMEK N (produced by NOF CORPORATION)) was added and, immediately, deaeration was performed in a vacuum chamber. A cast-molded plate having a thickness of 6 mm was obtained by performing casting and curing at room temperature and further performing post-curing at 80° C. for 8 hours. The fracture toughness value was measured by the same test method as that in Example 23.

Comparative Example 4

Measurement of Fracture Toughness Value of Vinyl Ester Resin Processed Product Containing No Cellulose Nanofiber

[Production of Processed Product, Method for Producing Test Specimen, and Fracture Toughness Test]

A vinyl ester test specimen containing no cellulose fiber was produced by the same method as that in Example 33, and the fracture toughness value was measured.

After 0.3 parts by weight of 6% Co-Naph (cobalt naphthenate) was added to a vinyl ester resin UE-3505 (produced by DIC Corporation), dispersion and agitation were performed with a homomixer (produced by PRIMIX Corporation). Furthermore, 1 part by weight of 55% methyl ethyl ketone peroxide (PERMEK N (produced by NOF CORPORATION)) was added and deaeration was performed in a vacuum chamber. A cast-molded plate having a thickness of 6 mm was obtained by performing casting and curing at room temperature and further performing post-curing at 80° C. for 8 hours. The fracture toughness value was measured by the same test method as that in Example 23.

Figure 5:
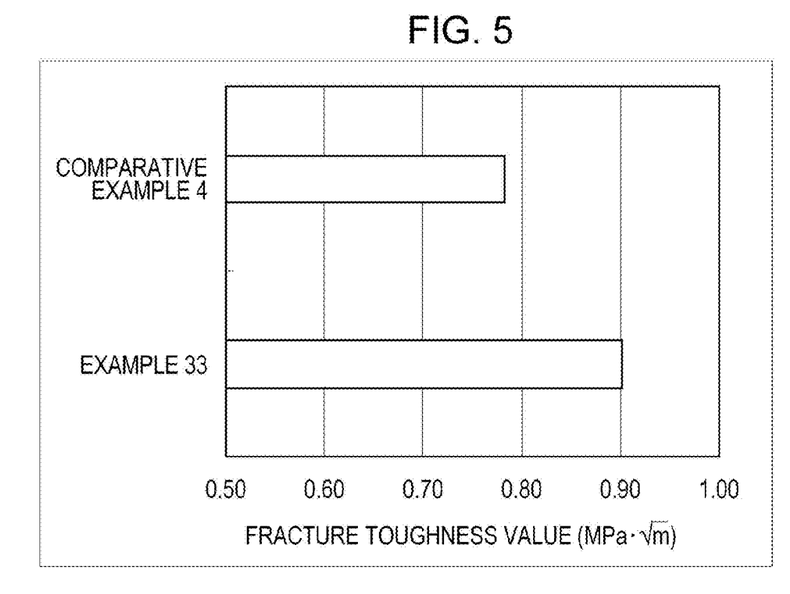
FIG. 5 is a graph showing fracture toughness values of Example 33 and Comparative example 4.

The results of Example 33 and Comparative example 4 are collectively shown in FIG. 5.

Example 34

Measurement of Fracture Toughness Value of Unsaturated Polyester Resin Processed Product Using Masterbatch Containing Cellulose Nanofibers Obtained by Polyester Based Resin 1

[Production of Processed Product, Method for Producing Test Specimen, and Fracture Toughness Test]

The masterbatch produced in Example 23 was used. A test specimen, was produced by employing a forming method described below, and the fracture toughness value was measured.

After the masterbatch in the proportion of 4.0 parts by weight in terms of cellulose content was added to an unsaturated polyester resin SUNDHOMA FG-283 (produced by DH Material Inc.), dispersion and agitation were performed with a homomixer (produced by PRIMIX Corporation). A cast-molded plate having a thickness of 6 mm was obtained by a casting method. The fracture toughness value was measured by the same test method as that in Example 23.

Comparative Example 5

Measurement of Fracture Toughness Value of Unsaturated Polyester Resin Processed Product Containing No Cellulose Nanofiber

[Production of Processed Product, Method for Producing Test Specimen, and Fracture Toughness Test]

An unsaturated polyester resin test specimen containing no cellulose fiber was produced by the same method as that in Example 34, and the fracture toughness value was measured.

An unsaturated polyester resin SUNDHOMA FG-283 (produced by DH Material Inc.) was dispersed and agitated with a homomixer (produced by PRIMIX Corporation). A cast-molded plate having a thickness of 6 mm was obtained by the casting method. The fracture toughness value was measured by the same test method as that in Example 23.

Figure 6:
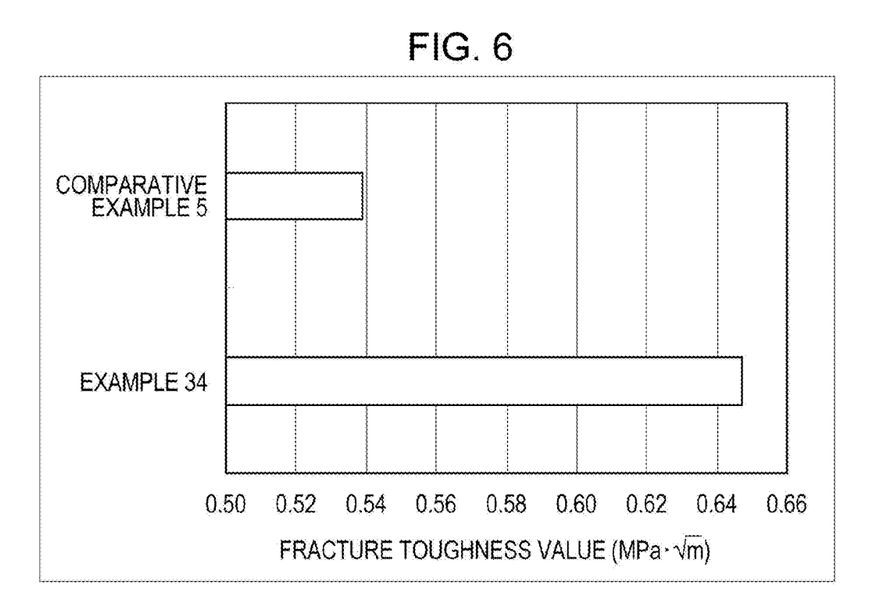
FIG. 6 is a graph showing fracture toughness values of Example 34 and Comparative example 5.

The results of Example 34 and Comparative example 5 are collectively shown in FIG. 6.

INDUSTRIAL APPLICABILITY

According to the present invention, cellulose can be fibrillated in the absence of water or organic solvent. Meanwhile, a resin composition having enhanced mechanical strength can be produced by using fibrillated cellulose nanofibers and a masterbatch. Therefore, the present invention has high possibility of industrial utilization.

The invention claimed is:

1. A method for manufacturing a cellulose nanofiber comprising the step of fibrillating cellulose in a polyester based resin,
   wherein the ester group concentration of the polyester based resin is 6.0 mmol/g or more and the acid value is 10 KOHmg/g or more.

2. A method for manufacturing a cellulose nanofiber comprising the step of fibrillating cellulose in a polyester based resin,
   wherein the ester group concentration of the polyester based resin is 6.0 mmol/g or more and the hydroxyl value is 10 KOHmg/g or more.

3. The method for manufacturing a cellulose nanofiber according to claim 1 or 2, wherein the ester group concentration of the polyester based resin is 6.0 mmol/g or more, the acid value is 10 KOHmg/g or more, and the hydroxyl value is 10 KOHmg/g or more.

4. The method for manufacturing a cellulose nanofiber according to any one of claims 1 to 2, wherein the cellulose is fibrillated in the absence of water.

5. The method for manufacturing a cellulose nanofiber according to claim 2, wherein the ester group concentration of the polyester based resin is 6.0 mmol/g or more, the acid value is 10 KOHmg/g or more, and the hydroxyl value is 10 KOHmg/g or more.

6. A masterbatch composition comprising the cellulose nanofibers and the polyester based resin obtained by the manufacturing method according to any one of claims 1 to 2.

7. A resin composition in which the masterbatch composition according to claim 6 and a diluent resin are mixed.

8. A processed product produced by forming the resin composition according to claim 7.

9. A cellulose nanofiber obtained by the manufacturing method according to claim 2, wherein the cellulose is fibrillated in the absence of water.

10. A cellulose nanofiber obtained by the manufacturing method according to claim 3, wherein the cellulose is fibrillated in the absence of water.

11. A cellulose nanofiber obtained by the manufacturing method according to claim 5, wherein the cellulose is fibrillated in the absence of water.

12. A masterbatch composition comprising the cellulose nanofibers and the polyester based resin obtained by the manufacturing method according to claim 2.

13. A masterbatch composition comprising the cellulose nanofibers and the polyester based resin obtained by the manufacturing method according to claim 3.

14. A masterbatch composition comprising the cellulose nanofibers and the polyester based resin obtained by the manufacturing method according to claim 4.

* * * * *